Figure 1:
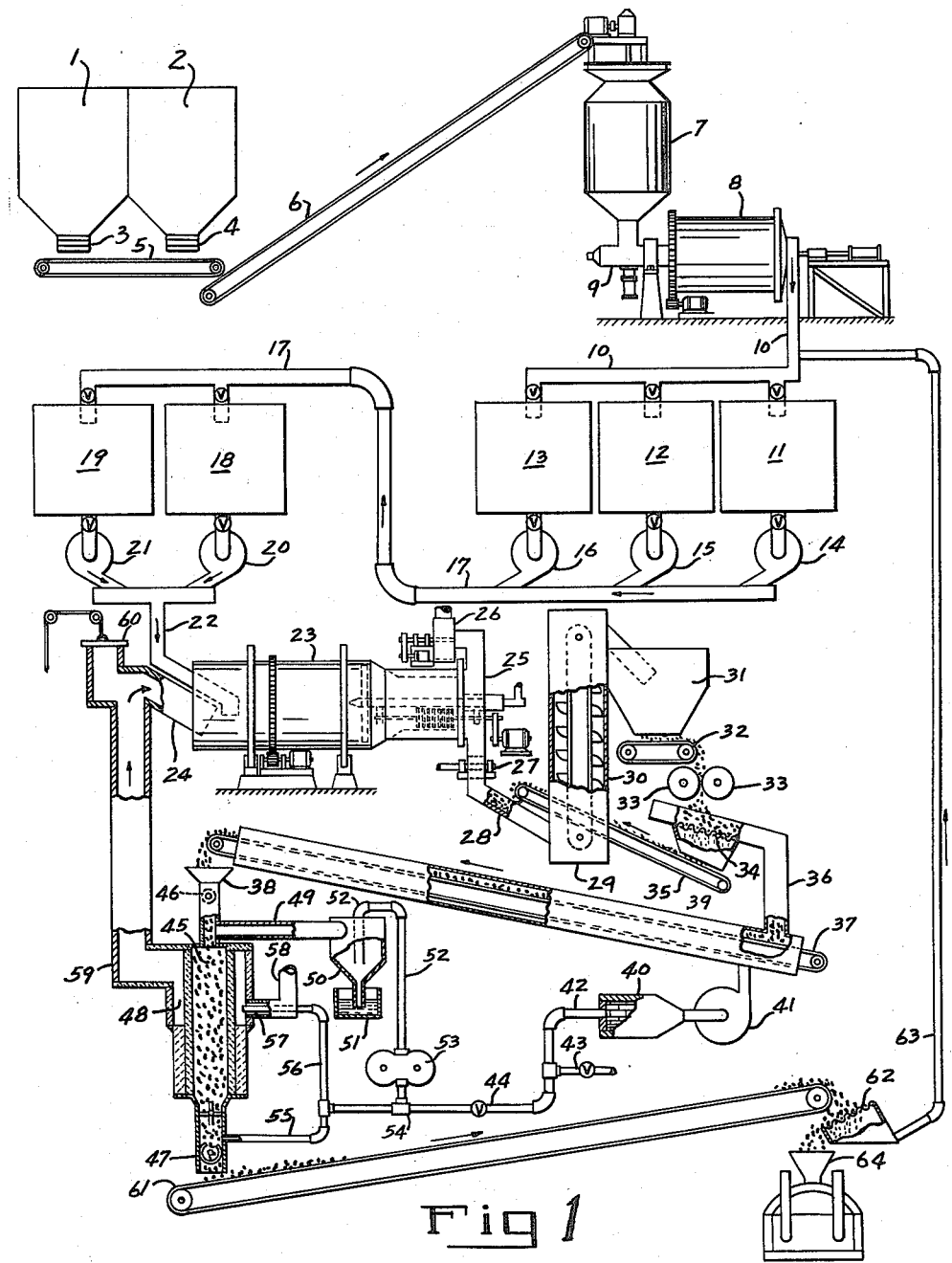

Nov. 22, 1960    B. G. KLUGH    2,961,411
PROCESS FOR PRODUCING METALLURGICAL FURNACE CHARGE MATERIAL
Filed Aug. 6, 1954    2 Sheets-Sheet 1

INVENTOR.
BETHUNE G. KLUGH
BY

Nov. 22, 1960 B. G. KLUGH 2,961,411
PROCESS FOR PRODUCING METALLURGICAL FURNACE CHARGE MATERIAL
Filed Aug. 6, 1954 2 Sheets-Sheet 2

INVENTOR.
BETHUNE G. KLUGH
BY

United States Patent Office 2,961,411
Patented Nov. 22, 1960

2,961,411

PROCESS FOR PRODUCING METALLURGICAL FURNACE CHARGE MATERIAL

Bethune G. Klugh, deceased, late of Birmingham, Ala., by The First National Bank of Birmingham, executor, Birmingham, Ala., assignor to Monsanto Chemical Company, St. Louis, Mo., a corporation of Delaware Filed Aug. 6, 1954, Ser. No. 448,265

12 Claims. (Cl. 252—188.3)

This invention provides a process for producing metallurgical furnace charge material.

The primary object of this invention is to provide an economical and improved method for the preparation of a metallurgical furnace charge.

The ores or minerals which may be treated by the herein-described invention may be minerals containing phosphatic values or metalliferous values, the latter including iron, silicon, aluminum, calcium, titanium, tungsten, chromium, vanadium, boron, manganese, zirconium and the like. The mineral carbonaceous charge material herein produced may be employed in the reductive smelting and recovery of phosphorus, calcium carbide, ferrosilicon, ferroaluminum silicon, calcium silicon, calcium aluminum silicon, fused alumina, silicon carbide, ferrotitanium, ferrotungsten, ferroboron, ferrovanadium, ferromanganese, ferrosilicon and the like. In the process for producing the above products, the metallurgical operation involves in each case a high temperature smelting of the minerals in the presence of carbon.

For example, the method may be applied to the manufacture of calcium carbide in which case there would be involved the use of natural carbonate of lime, by-product carbonate of lime, lime hydrate and calcined lime together with auxiliary agents such as iron oxide for removal of phosphate, silicon and aluminum. In addition, bituminous coal would be used to provide the reacting, combining and reducing carbon in the coked calcined product.

The amount of fluxing agents is predetermined by calculation from analysis, and the coal addition is such that the required proportions of carbon for reduction will obtain with its complete coking and devolatilization.

By reason of the uniform, non-segregable character of the charge material produced by the present invention, the recovery of the mineral values therein is rendered more efficient and in all cases has been found to take place at lower temperatures and consequently with a smaller expenditure of thermal energy.

It has been found that a carbon-bearing metallurgical furnace charge material may be prepared by forming an aqueous slurry of mineral material and coal containing volatile, combustible material by first agglomerating the said slurry by exposure of said slurry to heated gases to form a mineral aggregate having sufficient moisture so that it may be formed into briquettes, drying said briquettes and then coking and calcining the briquettes under conditions such that volatile, combustible material evolved from the contained coal is recovered and then burned with air to form heated combustion gases, which gases are then employed to coke-calcine said briquettes and also to form the aggregates from said initial slurry by evaporation of water therefrom. If desired, the drying of said briquettes prior to said coking-calcining may also be carried out utilizing the heat of gases obtained by the combustion of said volatile material evolved from the coal present in the briquettes.

The operation of coking-calcining referred to herein comprises generally the step of heating the coal-containing briquettes to the coking temperature of the coal contained therein, whereby volatile, combustible material is evolved therefrom and the residue of the coal is coked within the briquette. At the same time any mineral carbonates, hydrates, or fluorides are calcined and decomposed with liberation of $CO_2$, water vapor, compounds of fluorine and other volatile materials contained therein. The briquettes so obtained are substantially free of volatile material and by virtue of the physical hardness and homogeneous nature thereof are ideally suited for use in the metallurgical furnacing of the ore contained therein.

While the formation of briquettes from the ore agglomerates is preferred as yielding the most desirable furnace charge material, such briquetting is not necessary and may, in some cases, be omitted. If such briquetting is omitted it has been found entirely practical to utilize the agglomerates per se as furnace charge material. When this practice is followed, the agglomerates are subjected to calcination by exposure to heated gases, so that the coal contained therein is coked, the volatile matter is evolved and utilized for the formation of the agglomerates from the aqueous slurry as well as for the calcination of the agglomerates. Should it be desirable to dry the agglomerates prior to calcination, this drying may also be done by utilizing the heat derived by the combustion of the volatile matter in the coal.

Figure 2:
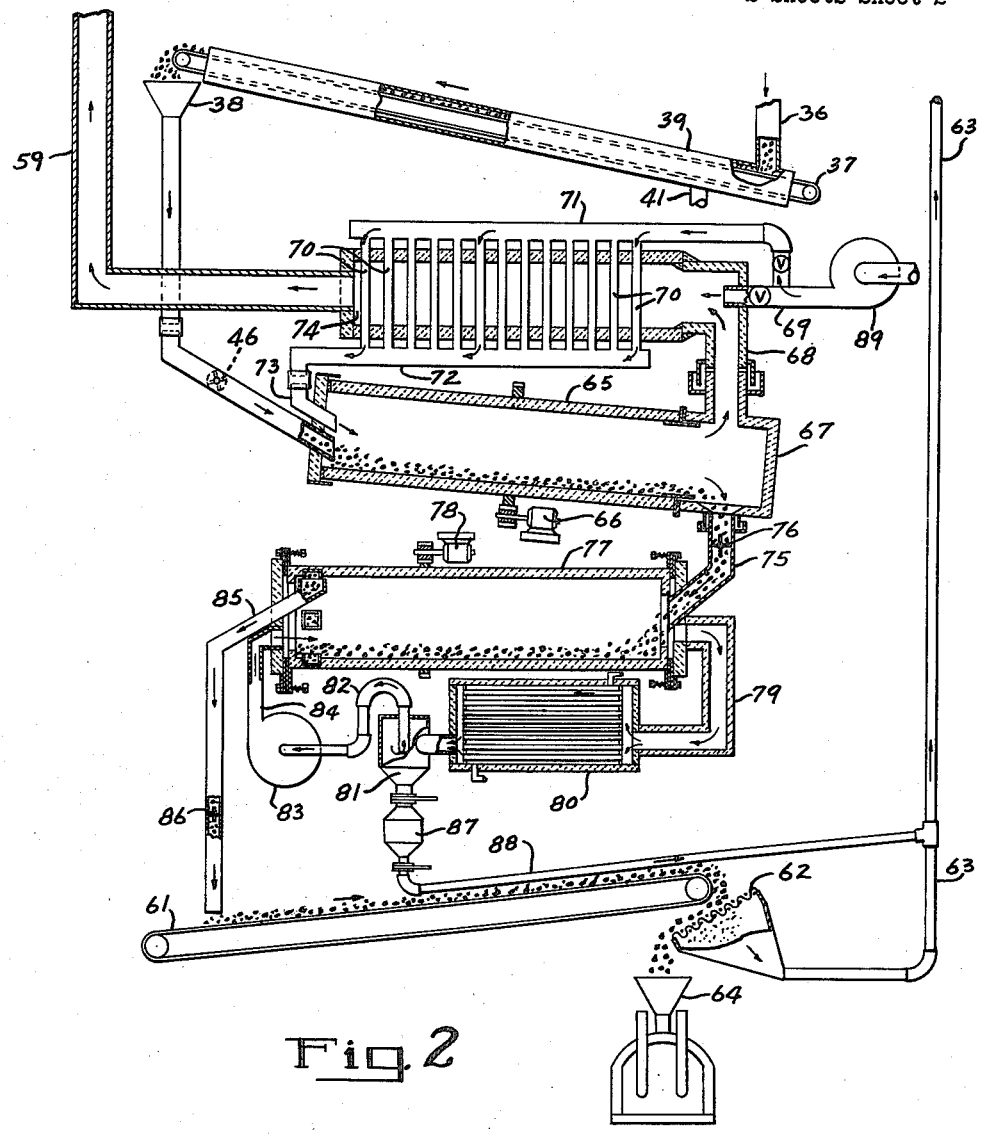

The present invention will be understood by reference to the accompanying drawings, in which Fig. 1 is a flow diagram showing the relationship of the various parts of the apparatus and the flow of materials therein, while Fig. 2 is a flow diagram of alternative coking-calcining means, which may be substituted in lieu of the coking-calcining means shown in Fig. 1.

Iin Fig. 1, numerals 1 and 2 indicate ore and coal storage bins, respectively, both provided with bottom discharge means 3 and 4, whereby the contents of the bin may be proportioned and discharged to belt 5. The latter discharges onto belt 6, whereby the ore and coal mixture is conveyed to tank 7. The mixture of ore and coal, together with sufficient water to form a slurry therewith is discharged to the rod or ball mill 8 by means of pipe connection 9.

While any suitable type of rod mill and stock feed mechanism may be used for the preparation of the slurry it is preferred to employ the wet-grinding method and apparatus described and claimed in copending application Serial No. 164,321, filed May 26, 1950, now U.S. Patent No. 2,754,067 which case is assigned to the same assignee as is the present case.

Referring again to Fig. 1, the operation of rod mill 8 results in the formation of a mineral coal containing aqueous slurry, the particles thereof being sufficiently small so as to pass a 60 mesh screen. Upon completion of the grinding and slurry forming operation, the slurry is discharged from rod mill 8 and conveyed by conduit 10 to a plurality of storage tanks 11, 12 and 13. While the slurry is maintained in tanks 11, 12 and 13, it is desirably agitated so that any settling out of the solid phase is substantially avoided. The ore-coal slurry contained in storage tanks 11, 12 and 13 is pumped as required by pumps 14, 15 and 16 and thereby conveyed by pipe 17 to slurry feed and blending tanks 18 and 19. From feed tanks 18 and 19 the slurry is fed by pumps 20 and 21 into pipe 22 and thence into rotary cylinder 23. Simultaneously there is supplied to cylinder 23 a stream of hot combustion gases by means of pipe 24. The effect of rotation of the rotary cylinder 23 and the supply of hot combustion gases entering by pipe 24 serves to evaporate the water in the slurry and to agglomerate the solid mineral and coal particles present in the slurry. The introduced gases, together with the water vapor formed are exhausted at the discharge end of cylinder 23, being withdrawn therefrom through housing 25 by the action of exhaust fan 26. The dried agglomerates constituting the solids present in the slurry and containing preferably not in excess of 15% by weight of water are discharged into the lower part of housing 25. By means of rotary discharge wheel 27, the formed agglomerates are discharged into conduit 28 and thence into boot 29 of elevator 30.

While any suitable type of agglomerating device may be employed for the purpose of forming agglomerates from the slurry solids, it is preferred to utilize the particular apparatus and method described and claimed in application Serial No. 164,322, filed May 26, 1950 by Bethune G. Klugh and Riley N. Weston now U.S. Patent No. 2,695,221, which case is assigned to the same assignee as is the present case.

Elevator 30 conveys the agglomerates into feed bin 31, which in turn discharges the feed onto belt 32, from whence it drops into briquetting rolls 33, wherein the agglomerates are pressed into briquettes.

The briquettes so produced are discharged upon screen 34, whereupon any fines which may be produced are screened out and returned by conveyor 35 to conveyor 28 for return to the briquetting rolls.

The briquettes passing over the screen 34 are conveyed by pipe 36 onto screen conveyor 37 and thence delivered to hopper 38. Conveyor 37 is surrounded by housing 39. During the conveying of the briquettes by means of conveyor 37 they may be dried by means of hot gases produced in combustion chamber 40, which gases are blown into housing 39 by means of fan 41.

Combustion chamber 40 is supplied with heating gases by means of pipe 42. For this purpose either gas from an external source which is introduced by valved pipe 43, or calcination-derived gas supplied by valved pipe 44 may be employed.

While the formation of briquettes from the agglomerated product is preferred as giving the most desirable furnace burden, such formation of briquettes may be dispensed with and the agglomerates received by pipe 28 may be delivered directly into hopper 38, or, if additional drying thereof is desired, into pipe 36. The agglomerates then follow the further course described for the briquettes.

The briquettes which have been delivered into hopper 38 are admitted into calcining chamber 45 by means of valve 46, then pass downwardly through chamber 45 and are discharged in calcined form at the lower end 47 thereof.

During the passage of the bituminous coal-containing briquettes through chamber 45, they are first subjected, in the upper part thereof, to the indirect action of heat supplied thereto by a surrounding heating chamber 48. The amount of heat supplied is at such a temperature so as to substantially completely volatilize the volatile, combustible matter in the coal and also any moisture or mineral matter contained in the briquettes. Generally, a temperature in the neighborhood of 1000° C. should be attained by the briquettes while passing through chamber 45. The volatile matter which is liberated from the coal approximates coke oven gas in composition and is discharged by means of pipe 49 into tar-separating chamber 50, wherein the gases are cooled and heavy tars and water vapor are condensed, separated and withdrawn into tank 51. The resulting cleaned gas so produced leaves tar-separating chamber 50 by means of pipe 52 and is thence forced by blower 53 into pipe 54. A portion of said cooled gas then enters pipe 55, being then admitted to pipe 47, wherein it passes upwardly through the column of descending briquettes serving to cool the same. Another portion of the gas passes into pipe 56, thence to gas burner 57, wherein it is mixed with combustion air entering at 58 and then burned. The burned gases formed at burner 57 serve to heat chamber 48 and retort 45 to the required temperature.

A further part of the gas supplied by pipe 54 may be passed to valved pipe 44 and thence pipe 42, after which it is admitted to combustion chamber 40.

The coking-calcining process is separately described and claimed in copending application Serial No. 108,466, filed August 4, 1949, now Patent No. 2,675,307, which application is also assigned to the same assignee as is the present case.

The hot gases which have been used to heat retort 45 by passing through surrounding chamber 48 are passed into insulated conduit 59 which joins pipe 24 and then enter the interior of cylindrical agglomerating cylinder 23. However, any excess gases in pipe 59 may be vented to the atmosphere by opening valve means 60, should this be necessary.

The coked-calcined briquettes which are discharged after cooling from pipe 47 are conveyed by belt conveyor 61 to screening means 62. Fines which have been produced are thereby separated and returned by pipe 63 to pipe 10, and thence reintroduced to the slurry tanks 11, 12 and 13 as may be desired.

The oversized product discharged from screen 62 falls into metallurgical furnace 64, wherein the desired metallurgical reactions are carried out.

An alternative process for coking-calcining briquettes or agglomerates in lieu thereof is shown in Fig. 2, wherein like numerals refer to the same items.

In Fig. 2, the briquettes or agglomerates entering hopper and conduit 38 pass through feed valve 46 and enter rotary calcining cylinder 65 driven by motor 66. The temperature within cylinder 65 is sufficiently high so as to substantially completely coke and calcine the briquettes therein and also to vaporize the volatile matter of the coal present therein. The gases generated thereby pass out through stationary end chamber 67 into pipe 68, which is a part of the combustion chamber 74. Air is supplied to combustion chamber 74 by means of valved pipe 69 and fan 89 and combustion takes place therein. Combustion chamber 74 contains a plurality of air-heater tubes 70 supplied with air from pipe 71 and delivering heated air to pipe 72. The heated air enters coking-calcining chamber 65 by means of pipe 73. The combustion of the so-heated air and the volatile matter derived from the coal serves to maintain the temperature in chamber 65. Desirably the combustion is maintained under reducing conditions so as not to oxidize the non-volatile carbon present in the briquettes. In this manner all of the volatile matter in the coal including the tars are burned and the heat so obtained utilized as described.

The heat contained in the gases pasing out of the air-heating combustion chamber 74 by means of pipe 59 is utilized in the agglomerating cylinder 23, referred to in Fig. 1.

Returning to Fig. 2, the hot calcined briquettes formed in cylinder 65 pass from the discharge end of the cylinder into pipe 75 containing valve 76 and enter rotary cooling cylinder 77 driven by motor 78. Cooling takes place therein in an atmosphere of inert, non-oxidizing gases. These gases are withdrawn through pipe 79, pass into tubular water cooler 80 and thence to a cyclone dust collector 81. The cooled gases obtained from the cooler are then drawn through pipe 82 into fan 83 and returned by pipe 84 into cylinder 77, wherein they absorb more heat and are again cooled as above described.

The resulting, cooled briquettes are removed by collector 85 containing valve means 86 and deposited on belt 61 for delivery to screen 62 and thence to furnace 64.

Dust removed from the cooling gases by collector 81 is dropped into tank 87, thence into air conveyor 88. This conveyor joins with conveyor 63 and serves to return the dust and fines eventually to pipe 10 of Fig. 1 for recovery therein.

This application is a continuation in part of application

Serial No. 164,323, filed May 26, 1950, now abandoned.

What is claimed is:

1. A process for producing a carbon-bearing smelting furnace charge which comprises forming an aqueous, flowable slurry of a mixture of finely divided mineral solids and bituminous coal, agglomerating said mixture with simultaneous application of heat thereto to form solid moisture-bearing agglomerates containing not in excess of 15% by weight of water and then calcining said solid agglomerates in a non-oxidizing atmosphere whereby volatile matter in said coal is volatilized, the heat employed during said agglomerating and calcining steps being derived by combustion of said volatile matter and thereafter cooling said agglomerates in a non-oxidizing atmosphere.

2. The process for producing a carbon-bearing calcium carbide furnace charge which comprises forming a flowable, aqueous slurry of a mixture of finely divided calcium containing solids and bituminous coal, agglomerating said mixture with simultaneous application of heat thereto to form solid moisture-bearing agglomerates containing not in excess of 15% by weight of water, then calcining said agglomerates in a non-oxidizing atmosphere, whereby volatile matter in said coal is volatilized, the heat employed during said agglomerating and calcining steps being derived by combustion of said volatile matter, and thereafter cooling said agglomerates in a non-oxidizing atmosphere.

3. The process for producing a carbon-bearing calcium carbide furnace charge which comprises forming a flowable, aqueous slurry of a mixture of finely divided calcium-containing solids and bituminous coal, agglomerating said mixture with simultaneous application of heat thereto to form solid moisture-bearing agglomerates containing not in excess of 15% by weight of water, briquetting said agglomerates and then calcining said briquettes in a non-oxidizing atmosphere, whereby solid matter in said coal is volatilized, the heat employed during said agglomerating and calcining steps being derived by combustion of said volatile matter and thereafter cooling said briquettes in a non-oxidizing atmosphere.

4. The process for producing a carbon-bearing phosphate furnace charge which comprises forming a flowable, aqueous slurry of a mixture of finely divided calcium phosphatic material and bituminous coal, agglomerating said mixture with simultaneous application of heat thereto to form solid moisture-bearing agglomerates containing not in excess of 15% by weight of water and then calcining said agglomerates in a non-oxidizing atmosphere, whereby volatile matter in said coal is volatilized, the heat employed during said agglomerating and calcining steps being derived by combustion of said volatile matter and thereafter cooling said agglomerates in non-oxidizing atmosphere.

5. The process for producing a carbon-bearing phosphate furnace charge which comprises forming a flowable slurry of a mixture of finely divided calcium phosphatic material and bituminous coal, agglomerating said mixture with simultaneous application of heat thereto to form moisture-bearing agglomerates containing not in excess of 15% by weight of water, briquetting said agglomerates and then calcining said briquettes in a non-oxidizing atmosphere, whereby volatile matter in said coal is evolved, the heat employed during said agglomerating and calcining steps being derived by combustion of said volatile matter and thereafter cooling said briquettes in a non-oxidizing atmosphere.

6. In a process for producing a carbon-bearing smelting furnace charge wherein heat is applied to an aqueous, flowable slurry of finely divided mineral solids and bituminous coal which is simultaneously agitated to form agglomerates containing not in excess of 15% by weight of water and said agglomerates are thereafter calcined to liberate volatile combustible matter contained in said coal and thereafter cooled, the steps of burning a portion of said volatile matter to supply hot products of combustion, applying heat contained in said products of combustion to said slurry and also to said agglomerates to calcine the same and contacting said calcined agglomerates with another portion of said volatile matter to cool the same.

7. In a process for producing a carbon-bearing calcium carbide furnace charge wherein heat is applied to a flowable slurry of finely divided calcium containing solids and bituminous coal which is simultaneously agitated to form agglomerates containing not in excess of 15% by weight of water and said agglomerates are thereafter calcined to liberate volatile combustible mater contained in said coal and said calcined agglomerates are thereafter cooled, the steps of burning a portion of said volatile matter to supply hot products of combustion, applying heat contained in said hot products of combustion to said slurry and also to said agglomerates to calcine the same and contacting said calcined agglomerates with another portion of said volatile matter to cool the same.

8. The method of firing pellets for a calcium carbide furnace charge by passing said pellets through a firing zone comprising, introducing a stream of pellets composed of particles of coal having a volatile content and particles of a calcium containing source material selected from the group consisting of mineral carbonates and hydrates into the entrance end portion of said firing zone, the amount of carbon in said coal being so proportioned in relation to the amount of calcium in said source material as to provide pellets which after firing are suitable for the production of calcium carbide in a furnace, heating said pellets to cause said coal volatiles to be expelled therefrom and to calcine said calcium source material in said firing zone, burning a portion of said volatiles in said firing zone with combustion air introduced into the entrance end portion of said firing zone in a regulated amount sufficient to burn only said portion of said expelled volatiles thereby providing an atmosphere in the exit end portion of said firing zone which is substantially devoid of oxygen and so minimizing a fixed carbon loss in said stream of pellets, maintaining the exit end portion of said firing zone at a temperature above the decomposition temperature of said mineral carbonates and removing both the fired pellets and the gases in the firing zone atmosphere from the exit end portion of said firing zone.

9. The method according to claim 8 and including burning the residual volatiles exteriorly of said zone and bringing the combustion products of said burning of residual volatiles into the heat exchange with air to be introduced.

10. The method of preparing a charge for a calcium carbide furnace comprising the steps of forming small pellets from a mixture of a finely-divided calcium source material, selected from the group consisting of mineral carbonates and hydrates and finely-divided coal containing volatiles, said mixture being such that, after firing, the pellet is suitable for the formation of calcium carbide, introducing said pellets and air into one end of a firing zone, heating said pellets in said firing zone in order to devolatize said coal into coke and volatiles and to calcine said calcium source material into a calcined material and vapors, effecting at least part of said heating by incompletely burning said volatiles after being evolved from said pellets with said air in said firing zone, controlling the quantity of said introduced air relative to the quantity of the volatiles in said coal so that only a predetermined part of said volatiles are burned and said incomplete burning results, moving said pellets and the atmosphere of said firing zone concurrently completely through said firing zone and in direct contact throughout said zone; whereby the atmosphere near the other end of the firing zone is substantially devoid of oxygen and hence any fixed carbon loss is minimized.

11. The method according to claim 10 and being further characterized by the step of utilizing heat sources derived from said firing zone atmosphere to preheat the air which is introduced.

12. The method according to claim 10 and further including the feature of maintaining the other exit end portion of said firing zone above the temperature at which carbon dioxide is evolved from said calcium source material at substantially atmospheric pressure.

References Cited in the file of this patent

UNITED STATES PATENTS

| | | |
|---|---|---|
| 1,494,130 | Reid | May 13, 1924 |
| 1,655,981 | Barr | Jan. 10, 1928 |
| 2,015,336 | Bunce | Sept. 24, 1935 |
| 2,314,296 | Wanner | Mar. 16, 1943 |
| 2,479,389 | Maust et al. | Aug. 16, 1949 |
| 2,536,365 | Handwerk | Jan. 2, 1951 |
| 2,674,581 | Balcar et al. | Apr. 6, 1954 |

FOREIGN PATENTS

| | | |
|---|---|---|
| 512,856 | Belgium | July 31, 1952 |